Oct. 28, 1924.
C. F. GAILOR
1,513,498
WELDED RAIL JOINT
Filed June 9, 1923    2 Sheets-Sheet 1
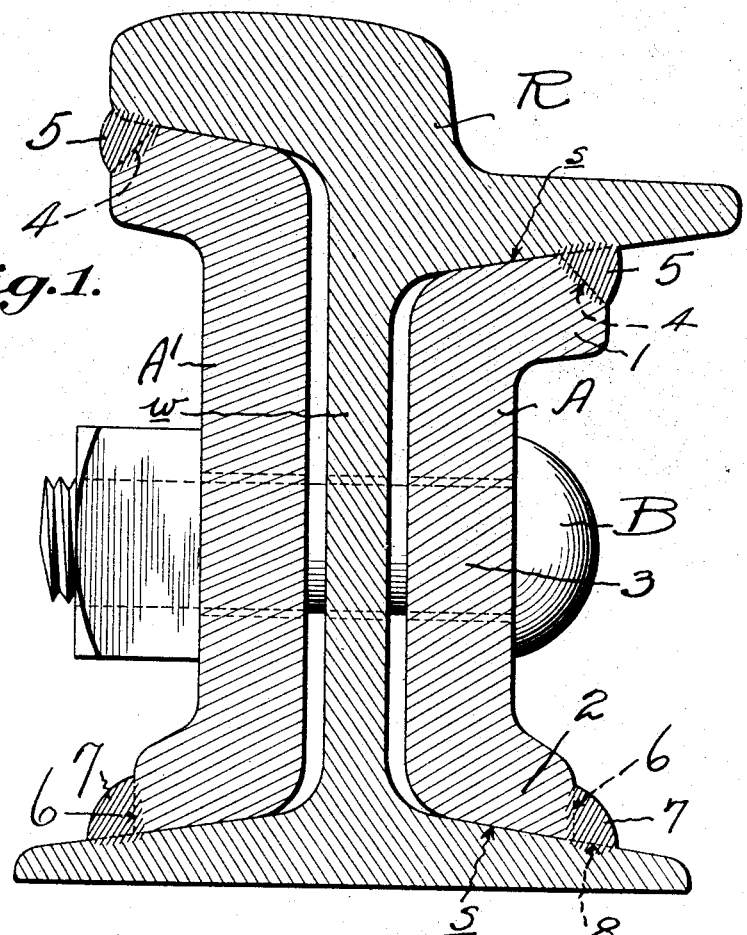
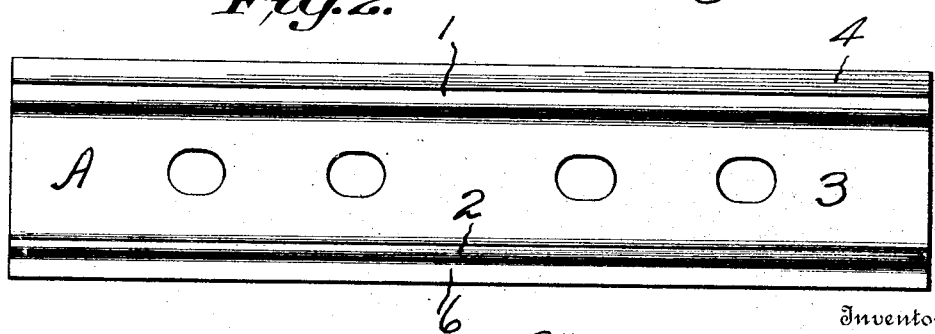
Witnesses:—
Chas. L. Griesbauer
Emory L. Groff
Inventor
CHESTER F. GAILOR
By D. P. Wolhaupter
Attorney Oct. 28, 1924. 1,513,498
C. F. GAILOR
WELDED RAIL JOINT
Filed June 9, 1923 2 Sheets-Sheet 2
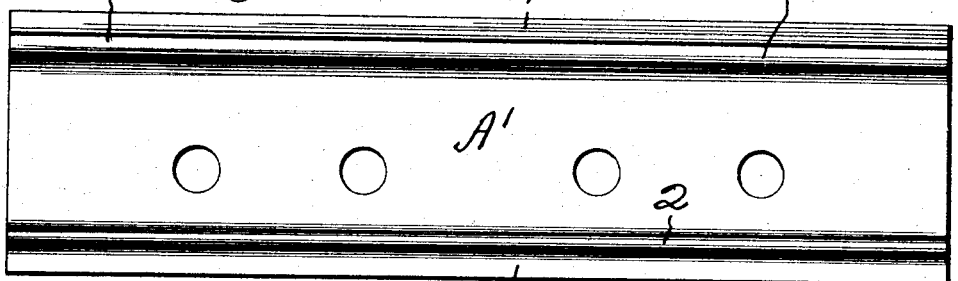
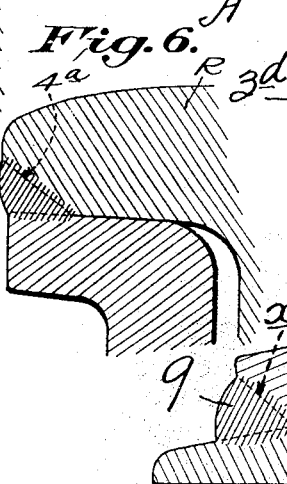
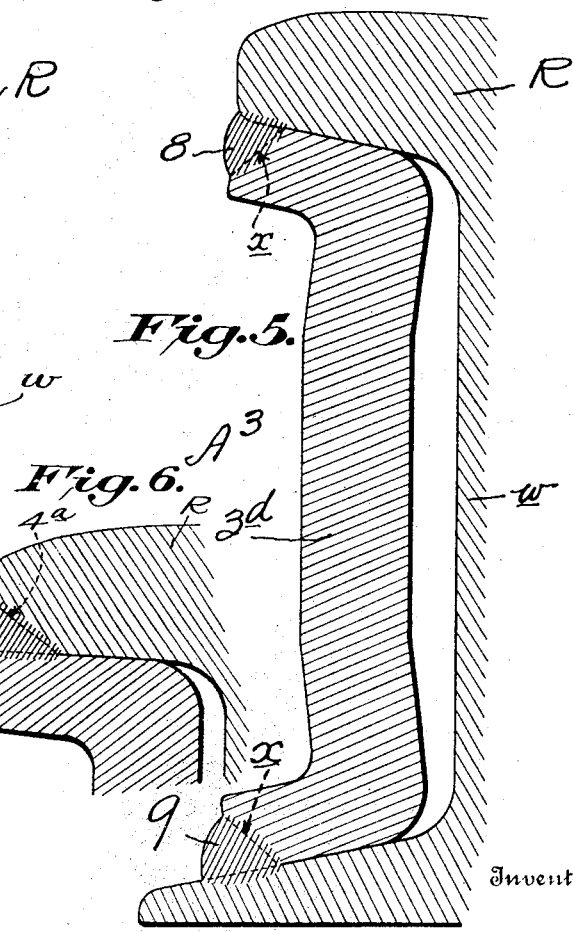
Witnesses:
Chas. L. Griestaver
Emery L. Groff
Inventor
CHESTER F. GAILOR,
By S. P. Wolhaupter
Attorney Patented Oct. 28, 1924.

1,513,498

UNITED STATES PATENT OFFICE.

CHESTER F. GAILOR, OF BROOKLYN, NEW YORK, ASSIGNOR TO THE RAIL JOINT COMPANY, OF NEW YORK, N. Y., A CORPORATION OF NEW YORK.

WELDED RAIL JOINT.

Application filed June 9, 1923. Serial No. 644,393.

*To all whom it may concern:*

Be it known that I, CHESTER F. GAILOR, citizen of the United States, residing at Brooklyn, in the county of Kings and State of New York, have invented certain new and useful Improvements in Welded Rail Joints, of which the following is a specification.

This invention relates to an improvement in welded rail joints, and has for its primary object the provision of a type of joint bar or plate which embodies all of the necessary and mechanical structural features required for welded track structures, and at the same time making proper provision for forming the weld in the most improved, serviceable and practical manner known to the welding art.

Heretofore, it has been the general practice in arc welding rail joints to weld standard plates of various types, sizes and thickness by making certain modifications thereof, such as planing off a portion of the plate at the top or bottom to admit of the application of the weld, and in some instances flat rectangular bars have been machined to fit the fishing surfaces of the various rail sections in as practicable manner as consistent for both the welding operation and the mechanical features of the joint structure.

In the welding of flat rectangular plates, it is necessary to make both the top and bottom welds in a direct line parallel to but at a considerable distance outward from the web of the rail so that any stresses set up in the joint due to shrinkage of the weld metal or contraction of the members would have a direct effect upon the welds themselves, in fact the structure is such that these stresses would be doubled in many instances.

Also, in the use of flat plates, as well as the ordinary rolled channel plates, where the top and lower portions of the plates are bevelled to admit of the welding, the fishing surfaces are sufficiently unequal to make it extremely difficult, if not impossible, to draw the plates up to their final position without canting or fitting them in an impractical position.

Accordingly, the present invention has in view the provision of a novel rolled joint bar of channel formation possessing special features and characteristics which permit of the welds being located far enough outside of the perpendicular axes of the plates to insure the welds being relieved from stresses set up in the joint due to shrinkage of the weld metal or contraction of the members, and to provide also plates whose upper and lower fishing surfaces are consistent with the best practice in the art, and which assure the final setting of the plates in their proper position.

A further object of the invention is to provide a joint bar that may be located in such a position as to insure maximum benefit both as to stiffness and strength, and which permits of using bolts of a minimum length, while at the same time the welding portions of the plates are designed in a way to be readily accessible, and also furnish an adequate amount of metal close to the welding zone to admit of a weld of larger capacity being made without any change in the construction or method of welding. In that connection the present design of joint bar takes into consideration the well defined theory that the mass of metal in close proximity to the weld has a decided function in the process of welding since it tends to control the action of the arc and assure the concentration and location of the final weld in the proper position to insure adequate strength for the weld and also assuring ease and reliability in applying the welding apparatus to make the welds.

With the above and other objects in view which will more readily appear as the nature of the invention is better understood, the same consists in the novel construction, combination and arrangement of parts, hereinafter more fully described, illustrated and claimed.

A preferred and practical embodiment of the invention is shown in the accompanying drawings, in which:—

Figure 1 is a cross section of the present improved welded rail joint.

Figure 2 is a side elevation of the inside plate shown in Figure 1.

Figure 3 is an elevation of the outside plate shown in Figure 1.

Figures 4 and 5 are sectional views of modifications of the joint bar forming the subject of the present invention.

Figure 6 is a detail view of a modification in forming the groove for the weld.

In carrying the present invention into effect it is proposed to provide a rolled joint bar A of channel cross-section thus providing the top flange 1 and base flange 2, the said bar being so constructed that the web 3 thereof may set as closely as possible to the web $w$ of the rail R, thereby not only assuring maximum girder stiffness and strength for the bar but also locating the same as closely as possible to the direct line of stresses caused by heavy car traffic.

Also, by reason of the special formation of the bar above referred to whereby the web 3 is set in close proximity to the rail web it is possible to utilize shorter joint bolts B, and furthermore enables the bolts to be located so that the heads of the bolts and the nuts are disposed in a position which interferes less with the welding process than any other type of joint bar or plate heretofore known. Also, the upper and lower fishing surfaces $s$ of the bar A are consistent with the best practice in the art and assure the final fitting and seating of the joint plates when the bolts B draw them into final position.

With further reference to the top and bottom flanges 1 and 2 of the bar or plate it is pointed out that by reason of the relative bulk or thickness of the flanges a sufficient quantity of metal is provided at both the top and bottom edges of the plate where the weld must be made, thereby insuring proper strength in the finished joint as well as providing considerable contact area for applying the welding apparatus in a reliable and practical manner. As previously indicated, the bulk of metal in the plate at the particular point where the welding is accomplished is important because it has considerable to do with the control and action of the electric arc weld while the welding is in progress. In connection with the top flange 1 it will be observed that the upper edge 1 is beveled as at 4 to receive the weld 5, and in the case of the bottom flange 2 it will be observed that the outer face 6 thereof is substantially vertical for a considerable distance above the base of the rail and in this instance the weld 7 is formed between the face 6 and the upper face 8 of the base flange of the rail.

It is one of the important and distinctive characteristics of the present invention that the outer face 6 of the bottom flange 2 of the joint bar is practically vertical for a considerable distance above the base of the rail flange because when the weld is made this arrangement prevents the arc from fluttering, and furthermore assures proper concentration of the arc and other electrical forces so that a weld of the greatest magnitude and highest character results. It is also a distinctive feature of the present invention that the welds 5 and 7 are made in the most readily accessible positions which assures a better opportunity of welding and inspecting the work, and which in the final analysis results in a better weld both from a structural and metallurgical standpoint.

It will also be observed that by reason of the extensive fishing surfaces of the plates it is possible to assure the proper fitting and final location of the joint plates in a position which assures the welding bevel 4 at the top of the plates being correctly positioned so that the welding rod of a predetermined size will, when welded, fill this opening in a most practical and desirable manner. Also, the bars A provide ample opportunity for increasing the depth and area of the welds 5 and 7 at or near the actual joint so as to dissipate the accumulated stresses at that point due to heavy car traffic, the extra depth and size of the weld at that point being accomplished by securing a weld of extra depth of penetration in the first application, and then applying an additional weld over the first one for the length and extent desired.

The bar A' at the opposite side of the joint has the same structural features and characteristics as the bar A except for the fact in the particular instance shown the bars are applied to the type of rail usually used in connection with street car tracks instead of the usual rail for steam roads, thus requiring a deeper bar at the outside of the joint.

A modification of the invention is shown in Figures 4 and 5 of the drawings wherein the web $3^a$ of the bar $A^2$ is bowed outwardly slightly at its central longitudinal portion thus providing a slightly outwardly advanced central portion $3^b$ in the zone of the application of the joint bolts while the ends $3^c$ taper slightly inwardly toward the web $w$ of the rail R. The purpose of this transverse bowing or arching of the bar is to overcome the possibility of not having good contact at the fishing edges $s'$ of the bar in event that the bar is subjected to unusual pressure due to the wrenching of the bolts too tightly. If the web was thin and high the bolt pressure might force the flanges $1^a$ and $2^a$ out of contact with the rail.

Figure 5 of the drawings illustrates a bar of the type shown in Fig. 4 wherein the bowed or transverse arched portion $3^d$ of the bar $A^3$ is somewhat more pronounced than in Fig. 4 for the purpose of preventing a condition where the extreme tightening of the joint bolts would cause the web of the bar to flex and pull the fishing edges of the top and bottom flanges of the bar away from the rail at the outer side of the joint.

In the form of the bar shown in Figures 4 and 5 the welds 8 and 9 may be provided in the manner illustrated by planing off the top and bottom edges of the flanges as indicated at $x$ to an angle of approximately 55° to provide cavities for receiving the weld metal and providing what is ordinarily known as a seam weld.

From the foregoing it will be apparent that the novel and distinctive feature of the present invention is the provision of a rolled joint bar particularly adapted and intended for welding purposes because it is located in such a way that the welding apparatus may be readily positioned and the welds located in a readily accessible position so that the electrodes of the electrical arc welding apparatus may be applied in the most effective manner.

Another feature of the invention resides in providing a joint bar, which although it occupies an inwardly advanced position in the fishing space of the rail, nevertheless does not contact with the rail but as precisely indicated, is spaced in close proximity to the rail web. In this way the flanges of the bar have a wedging fit in the fishing spaces of the rail and due to the pressure of the joint bolts drawing the bars inward toward the rail web, the said channel bar is placed under compression at its head and foot thereby insuring effective welds and relieving the latter of strain incident to loose fitting plates.

It will have been observed that a feature of practical importance which is taken into consideration by the present invention is that of providing the joint bar with a thickened head because it is necessary in order to produce an efficient weld that there be approximately the same amount of metal on either side of the weld, therefore making it desirable to have the amount of metal in the head of the joint bar approximately equal to the amount of metal in the head of the rail on the opposite side of the weld. Also, it will be noted that the foot portion of the joint bar is thickened to insure the making of a good weld rather than for strength required. Furthermore, in the construction shown in Figure 1 it has been emphasized that the foot of the joint bar presents an approximately vertical surface 6, and that surface should extend upwardly far enough to confine the arc when welding, thus preventing the arc from being distributed to a certain extent over the upper surface of the joint bar and thereby causing a weld of uncertain quality. These special features of confining the arc with approximately equal surfaces and equal amounts of metal on either side of the groove govern the magnitude of the weld and prevent material fluctuations in the magnitude of the arc, which fluctuations would cause welds of variable quality.

While under present conditions, with the conventional types of rail the form of invention shown in Fig. 1 presents a preferable construction, a modification may be resorted to as suggested in detail in Figure 6 of the drawing, wherein the rail is shown formed with a bevelled surface 4ª between which and the upper side of the head of the joint bar is provided the groove in which the weld is made. Such a construction would make it easier to make the weld.

Without further description it is thought that the features and advantages of the present invention will be readily apparent to those skilled in the art, and it is of course understood that changes in the form, proportion and minor details of construction may be resorted to without departing from the spirit of the invention or scope of the appended claims.

I claim:—

1. A welded rail joint including joint bars having upright webs lying within the fishing space of the rails and top and bottom outwardly deflected flanges, the top flange being formed with a cut-away portion for welding disposed beneath the rail head and the bottom flange being formed with an outer welding face disposed substantially in a vertical plane, the said cut-away portion of the top flange and the vertical face of the bottom flange being located outside of the zone of the load-carrying web portion of the bar.

2. A welded rail joint including joint bars having upright webs lying within the fishing space of the rails and top and bottom outwardly deflected flanges, the top flange being formed with a cut-away portion for welding disposed beneath the rail head and the bottom flange being formed with an outer welding face disposed substantially in a vertical plane, the said cut-away portion of the top flange and the said vertical face of the bottom flange lying inside of the vertical plane of the outer edge of the rail head.

3. A welded rail joint including a joint bar comprising a vertical web portion and offset top and bottom flanges lying inside of the vertical plane at the outer side of the rail head, said top flange being provided with an outwardly and downwardly inclining bevel for welding disposed beneath an edge of the rail head and the bottom flange being provided with a substantially vertical welding face, said bevel and said vertical face being located outside of the zone of the load-carrying web portion of the bar.

4. In a welded rail joint, a joint bar of channel formation having a web portion lying in relatively close proximity to the web of the rail and the said web portion being transversely bowed outwardly to thereby force the flanges of the bar into accurate seating engagement with the seating spaces of the rail when the joint bolts are tightened and welds for uniting the flanges of the bar to the rail.

In testimony whereof I hereunto affix my signature in the presence of two witnesses.

CHESTER F. GAILOR.

Witnesses:
 E. K. KERSHNER,
 C. A. DISBROW.